March 10, 1925.
W. M. BRITTON
LOCK NUT
Filed June 13, 1924
1,529,161
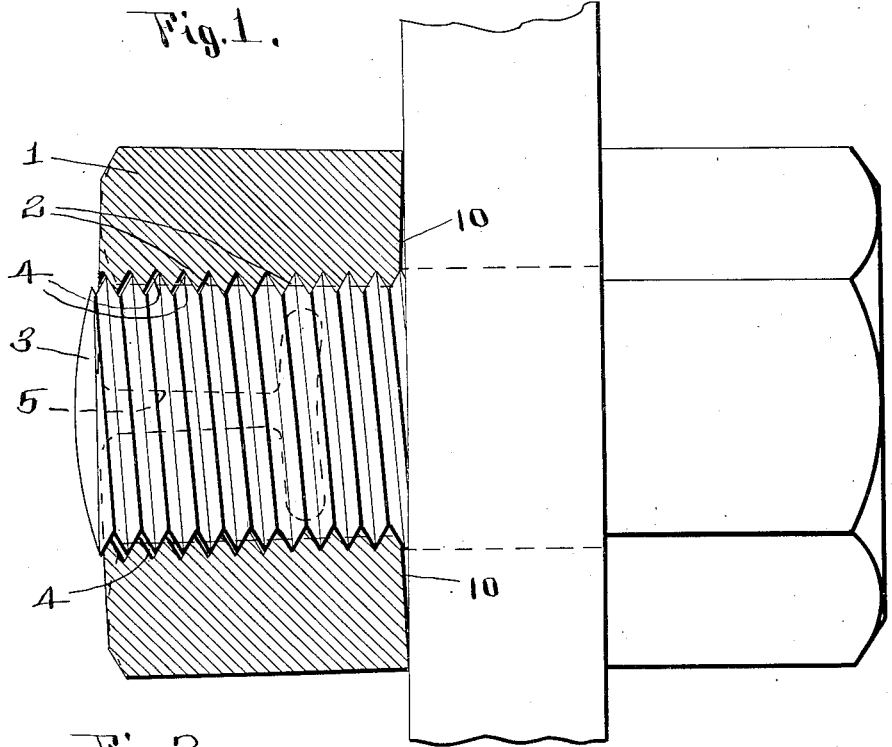
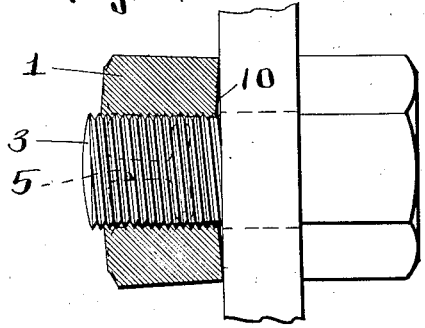
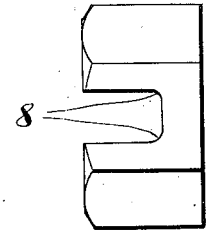
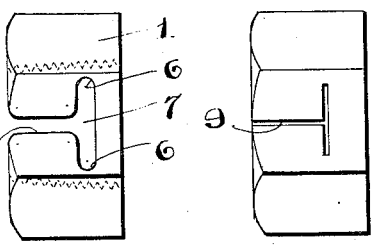
INVENTOR.
William M. Britton
BY Parsons + Bodell
ATTORNEYS.

Patented Mar. 10, 1925.

1,529,161

UNITED STATES PATENT OFFICE.

WILLIAM M. BRITTON, OF SYRACUSE, NEW YORK.

LOCK NUT.

Application filed June 13, 1924. Serial No. 719,702.

*To all whom it may concern:*

Be it known that I, WILLIAM M. BRITTON, a citizen of the United States, and a resident of Syracuse, in the county of Onondaga and State of New York, have invented a certain new and useful Lock Nut, of which the following is a specification.

This invention relates to lock nuts, and particularly to a lock nut which distorts or warps laterally while it is being turned on to a bolt and is provided with slots for facilitating such distortion, and it has for its object a slot construction by which the spreading or distorting strain is distributed and not concentrated at particular points.

The invention consists in the novel features and in the combinations and constructions hereinafter set forth and claimed and described.

In describing this invention reference is had to the accompanying drawings in which like characters designate corresponding parts in all the views.

Figure 1 is an enlarged sectional view of a nut embodying my invention, the same being shown as applied to a bolt.

Figure 2 is a view similar to Fig. 1, of another form of nut.

Figure 3 is an elevation of the nut shown in Fig. 2.

Figure 4 is an elevation of a modified form of this nut.

Figure 5 is an elevation of another modified form of this nut.

This lock nut comprises a body having a threaded bore, the threads being arranged to cause the nut to distort or warp as the nut is screwed on to a bolt, and means for distributing the spreading or distorting strain instead of concentrating it at particular points where it tends to split the nut body.

In Fig. 1, the numeral 1 designates the body of the nut, the body being of equal thickness throughout, that is, it is not formed with a smaller portion or a portion of less diameter at one end than at the other end. In Fig. 1, the threads 2 of the nut are constructed to have a different lead from the threads of the bolt 3 to which the nut is to be applied. Hence, when the nut is turned on to the bolt, it tends to warp or spread outwardly as the nut is turned on to the bolt. This is indicated in the drawings by the spaces 4 between the threads of the bolt, and the threads of the nut.

In order to facilitate the spreading or bending the nut is formed with one or more slots, preferably two diametrically opposite slots 5 extending inwardly from its outer end and terminating short of its inner end, the bottom end of each slot having a flat portion and rounding corners 6 in order to distribute the strain, the flat portion extending in a plane at a right angle to the axis of the nut. Also preferably the slots are formed with lateral extensions at their inner ends and usually the slots are T-shaped with the heads of the T located at the inner end of the slots, the corners of the head of the T being rounded at 6. However, as shown in Fig. 4, the slots instead of being T-shaped may be straight and the corners rounded as at 8.

In Fig. 5, a nut formed or folded from sheet metal is shown, the ends of an oblong blank being folded over on the central part of the oblong, this folding operation forming T-shaped slits or slots 9 between the folded end flaps or portions, and the central body portion of the blank. The process of forming it forms no part of this invention.

Instead of forming the threads of the nut with a different lead from those of the bolt, the nut may be formed with a cylindrical bore and with a conical bore in line with the cylindrical bore as in my pending application filed March 12, 1924, Sr. No. 698,590.

In either case, when the nut is turned on to the bolt, the nut will be warped, so that, its normally flat inner face is concaved as shown at 10 and the bending strain instead of being concentrated at points in line with the centers of the slots will, owing to the T-shaped heads and the rounding corners 6 or 8 be distributed throughout the base of the nut, that is, the unslotted part of the nut.

What I claim is:

1. A lock nut comprising a body having its threads arranged to distort the nut when the nut is turned on to a bolt, the nut being formed with a slot extending inwardly from one end and terminating short of the other end, the bottom of the slot being substantially flat and extended in a plane at right angles to the axis of the nut and provided with rounding corners.

2. A lock nut comprising a body having its threads arranged to distort the nut when the nut is turned on to a bolt, the nut being formed with a slot extending inwardly from one end and terminating short of the other end, the slot having a lateral extension at its inner end.

3. A lock nut comprising a body having its threads arranged to distort the nut when the nut is turned on to a bolt, the nut being formed with a slot extending inwardly from one end and terminating short of the other end, the slot being substantially T-shaped with the head of the T located at the inner end of the slot.

4. A lock nut comprising a body formed with a slot, extending inwardly from one end and terminating short of the other end, so as to weaken the base of the nut, the threads of the nut having a different lead from the threads of the bolt, to facilitate distortion of the nut body.

In testimony whereof, I have hereunto signed my name, at Syracuse, in the county of Onondaga, and State of New York, this 10th day of June 1924.

WILLIAM M. BRITTON.